US010082184B2

(12) United States Patent
Bouton et al.

(10) Patent No.: US 10,082,184 B2
(45) Date of Patent: Sep. 25, 2018

(54) SYSTEM AND METHOD FOR ELIMINATING ADVERSE CLUTCH VIBRATORY RESPONSES

(71) Applicant: Roll-Royce Corporation, Indianapolis, IN (US)

(72) Inventors: Matthew T. Bouton, Indianapolis, IN (US); Doug M. Schwerin, Zionsville, IN (US); Stanford O. Clemens, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 297 days.

(21) Appl. No.: 15/057,248

(22) Filed: Mar. 1, 2016

(65) Prior Publication Data
US 2016/0258497 A1    Sep. 8, 2016

Related U.S. Application Data

(60) Provisional application No. 62/126,884, filed on Mar. 2, 2015.

(51) Int. Cl.
| | |
|---|---|
| *F16D 48/06* | (2006.01) |
| *B64C 29/00* | (2006.01) |
| *B64D 35/00* | (2006.01) |
| *F01D 15/12* | (2006.01) |

(52) U.S. Cl.
CPC .......... *F16D 48/06* (2013.01); *B64C 29/0058* (2013.01); *B64C 29/0066* (2013.01); *B64D 35/00* (2013.01); *F01D 15/12* (2013.01); *F05D 2220/328* (2013.01); *F05D 2220/90* (2013.01); *F05D 2260/96* (2013.01); *F16D 2500/10412* (2013.01); *F16D 2500/50293* (2013.01)

(58) Field of Classification Search
None
See application file for complete search history.

(56) References Cited

U.S. PATENT DOCUMENTS

| | | |
|---|---|---|
| 5,065,849 A | 11/1991 | Kono et al. |
| 5,335,174 A | 8/1994 | Kohno et al. |
| 5,337,874 A | 8/1994 | Oltean et al. |
| 5,439,428 A | 8/1995 | Slicker |
| 5,624,350 A | 4/1997 | Bates |
| 6,050,379 A | 4/2000 | Lyon |
| 6,098,772 A | 8/2000 | Kimmig et al. |
| 6,202,816 B1 | 3/2001 | Doremus |
| 6,296,099 B1 | 10/2001 | Gochenour |
| 6,409,003 B2 * | 6/2002 | Naito ...................... F16D 48/06 192/110 R |
| 6,779,643 B2 | 8/2004 | Doremus et al. |
| 6,827,193 B2 | 12/2004 | Conrad et al. |
| 7,603,219 B2 | 10/2009 | Joshi et al. |
| 7,681,440 B2 | 3/2010 | Thomassin et al. |
| 8,042,673 B2 | 10/2011 | Adams |
| 8,131,438 B2 | 3/2012 | Herter et al. |

(Continued)

*Primary Examiner* — Justin Holmes
(74) *Attorney, Agent, or Firm* — Barnes & Thornburg LLP

(57) ABSTRACT

Systems and methods to control an amount of axial clearance within a clutch transmission system are disclosed. A propulsion system includes a clutch transmission system having clutch vibratory response clearance control logic configured to iteratively control the amount of axial clearance within the clutch transmission system so as to achieve a desired, e.g., consistent and/or limited, clutch vibratory response.

20 Claims, 7 Drawing Sheets

(56) References Cited

U.S. PATENT DOCUMENTS

| | | |
|---|---|---|
| 8,135,523 B2 | 3/2012 | Panzer |
| 8,256,297 B2 | 9/2012 | Sue et al. |
| 9,530,209 B2 | 12/2016 | Hatcher, Jr. et al. |
| 9,597,748 B2 | 3/2017 | Lardy et al. |
| 2007/0199790 A1 | 8/2007 | Whitmer et al. |
| 2008/0215221 A1* | 9/2008 | Baehr .................. F16D 48/064 701/68 |
| 2011/0024254 A1 | 2/2011 | Cookeriy et al. |
| 2011/0024258 A1 | 2/2011 | Avny et al. |

* cited by examiner

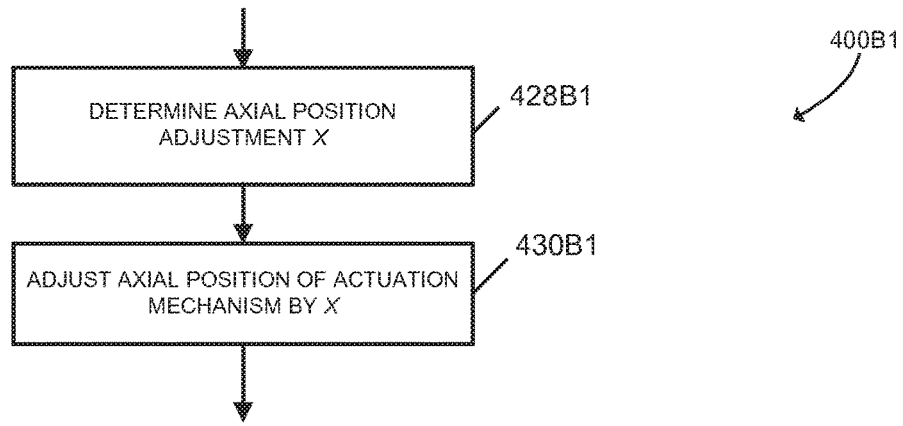
FIG. 4B1
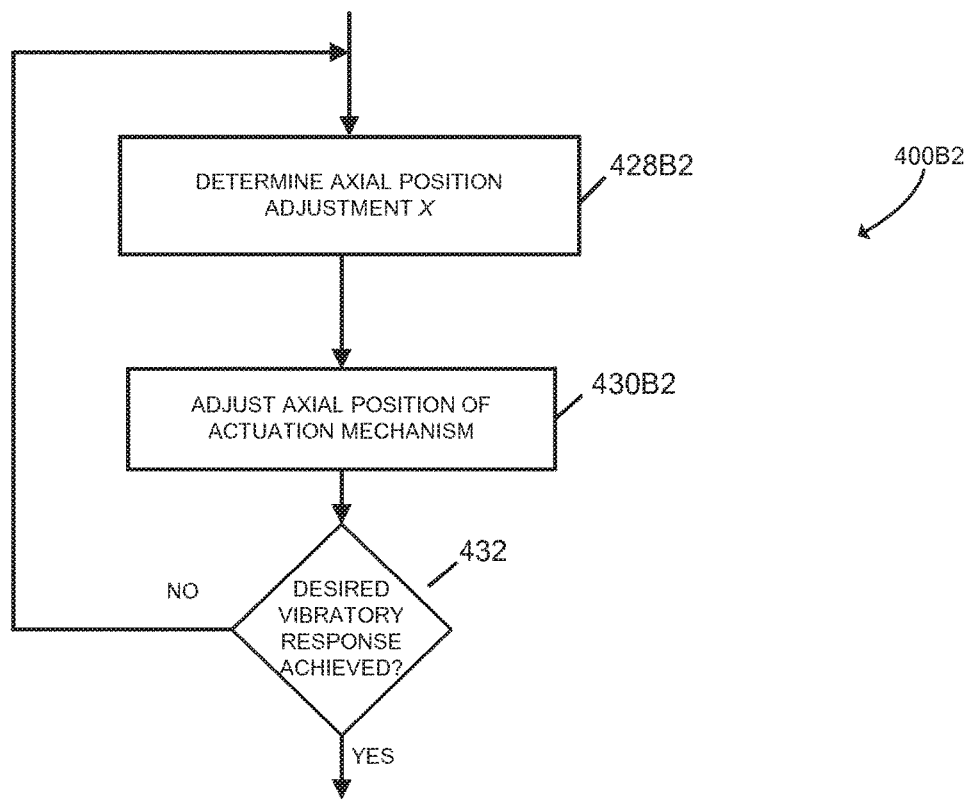
FIG. 4B2

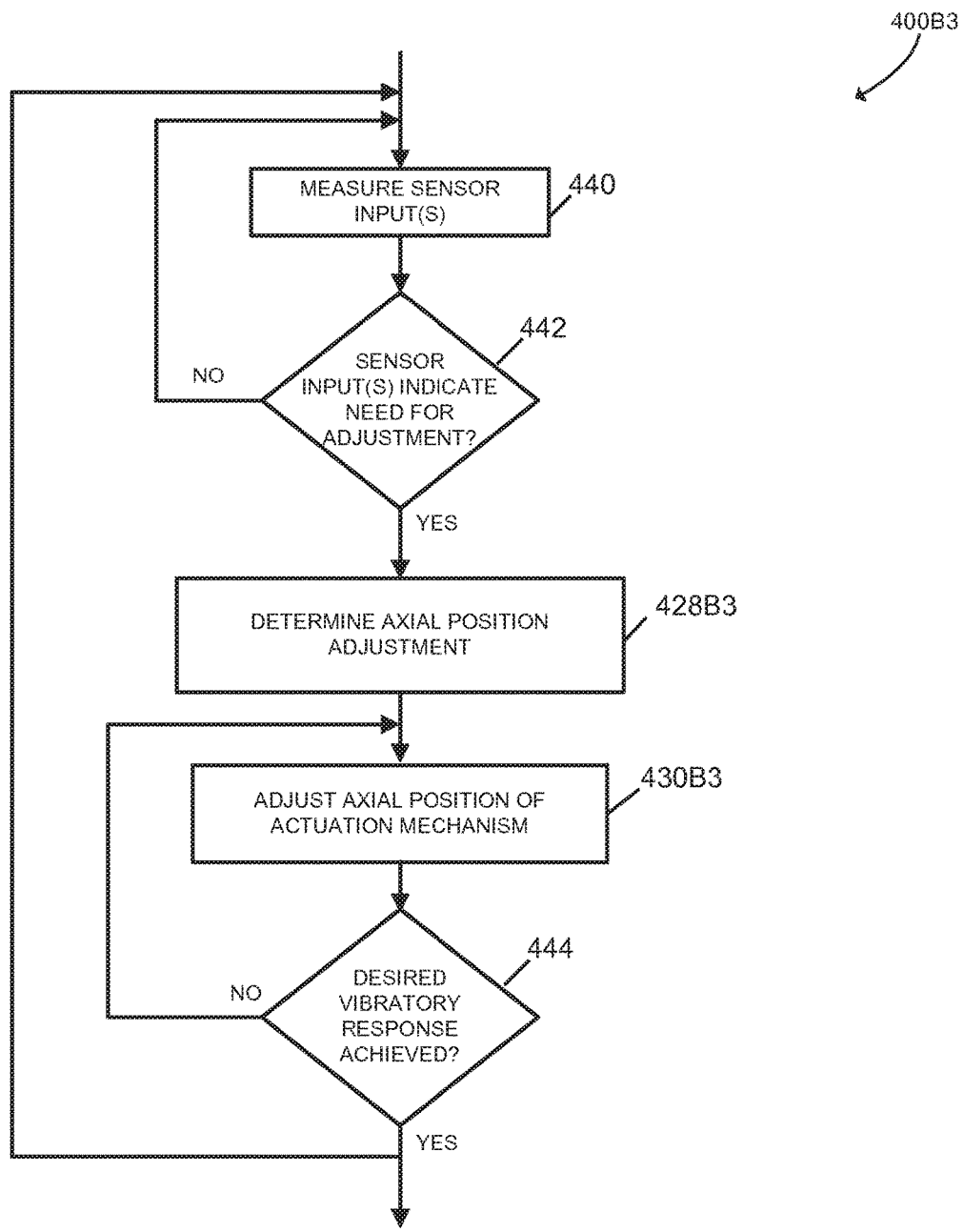
FIG. 4B3

SYSTEM AND METHOD FOR ELIMINATING ADVERSE CLUTCH VIBRATORY RESPONSES

CROSS-REFERENCE TO RELATED APPLICATIONS

This application claims the benefit of U.S. Provisional Patent Application No. 62/126,884 filed on Mar. 2, 2015, which is incorporated in its entirety herein by reference.

GOVERNMENT RIGHTS

This invention was made in part with government support under contract number N00019-02-C-3003 awarded by the United States Navy. The United States Government may have certain rights in this invention.

FIELD OF THE DISCLOSURE

The present disclosure relates generally to clutch transmissions, including but not limited to those used in propulsion systems, such as aircraft lift systems driven by gas turbine engines. More specifically, the present disclosure relates to a clutch vibratory clearance control system and method for eliminating adverse clutch vibratory responses.

BACKGROUND

Clutch transmissions can be used in gas turbine engine systems. Gas turbine engines are used to power aircraft, watercraft, power generators, and the like. Gas turbine engines typically include one or more compressors, a combustor, and one or more turbines. In typical aerospace applications, a fan or propeller is used to provide the majority of the engine thrust and is located in front of the core engine. The compressor includes alternating stages of rotating blades and static vanes, which increase the pressure of the air as it travels through the gas turbine core. The compressor thus outputs higher-pressure air, which it delivers to the combustor. A fuel pump supplies pressurized fuel (such as kerosene) to the combustor, typically via one or more fuel injectors. In the combustor, the fuel is mixed with the higher-pressure air and is ignited by an igniter. The products of the combustion reaction that occurs in the combustor (e.g., hot gas) are directed into a turbine. The turbine is typically made up of an assembly of discs with blades, which are attached to turbine shafts, nozzle guide vanes, casings, and other structures. The turbine converts the thermal energy supplied by the combustion products into kinetic energy. The work extracted from the combustion products by the turbine may be used to drive the fan, the compressor, and, sometimes, an output shaft. Leftover products of the combustion are exhausted out of the engine and can provide some thrust in some configurations.

Aerospace applications of gas turbine engines include turboshaft, turboprop, and turbofan engines. In typical aerospace applications, the gas turbine engine provides thrust to propel the aircraft, and also supplies power for engine accessories and aircraft accessories. Typical engine accessories include an engine control unit, a starter, fuel pumps, oil pumps, etc. Typical aircraft accessories include hydraulic pumps and electric generators to supply hydraulic and electrical power to the aircraft systems.

In some aerospace applications, the turbine engine powers a lift fan, which is capable of generating thrust sufficient to produce the forward vertical lift of the aircraft during takeoff. The lift fan may be part of a lift system that also includes a jet pipe and roll posts. The jet pipe is capable of redirecting the main engine thrust downward to provide rear vertical lift. The roll posts are mounted in the wings of the aircraft, and are used to achieve aircraft roll control. A clutch, such as a high-speed dry clutch, selectively connects the lift fan shaft to the turbine engine shaft, usually at the direction of the aircraft operator.

SUMMARY

The present application discloses one or more of the features recited in the appended claims and/or the following examples which, alone or in any combination, may comprise patentable subject matter.

In an example 1, according to at least one embodiment of this disclosure, a propulsion system includes a gas turbine engine; a shaft coupled to the gas turbine engine; an input speed sensor coupled to the shaft; a clutch coupled to the shaft; a clutch actuation mechanism coupled to the clutch; a load selectively coupled to the gas turbine engine by engagement of the clutch; an output speed sensor coupled to the load; and electronics comprising vibratory clearance control logic to: determine a current axial position of the clutch actuation mechanism at clutch engagement; determine an axial position adjustment for the clutch actuation mechanism based on a sensor input; and cause the clutch actuation mechanism to move to a post-engagement position defined by the current axial position and the axial position adjustment.

An example 2 includes the subject matter of example 1, and includes a position sensor coupled to the clutch actuation mechanism, where the current axial position of the clutch actuation mechanism is determined based on output of the position sensor. An example 3 includes the subject matter of example 1 or example 2, where the electronics are to determine an input speed based on output of the input speed sensor, determine an output speed based on output of the output speed sensor, compare the input speed to the output speed, and determine the current axial position when the input speed is substantially equal to the output speed. An example 4 includes the subject matter of any of examples 1-3, where the electronics are to determine a starting position of the clutch actuation mechanism, wherein the starting position is an axial position of the clutch mechanism prior to clutch engagement, and determine the current axial position of the clutch actuation mechanism relative to the starting position. An example 5 includes the subject matter of example 4, where the electronics are to determine the post-engagement position based on a difference between the current axial position and the axial position adjustment. An example 6 includes the subject matter of any of examples 1-5, where the electronics are to execute the vibratory clearance control logic to prevent an undesired vibratory response. An example 7 includes the subject matter of any of examples 1-5, where the electronics are to, periodically over time, determine a distance to clutch engagement based on a difference between a starting position and the current axial position, and decrease the axial position adjustment as the distance to clutch engagement increases. An example 8 includes the subject matter of any of examples 1-7, where the post-engagement position is between a starting position and the current axial position, and wherein the starting position is an axial position of the clutch mechanism prior to clutch engagement.

In an example 9, a clutch transmission system includes: an input shaft capable of being driven by an engine; an input speed sensor coupled to the input shaft; a clutch coupled to the input shaft; a clutch actuation mechanism coupled to the clutch; and electronics comprising vibratory clearance control logic to, over time during operation of the clutch transmission system: determine a current axial position of the clutch actuation mechanism at clutch engagement; determine a post-engagement position for the clutch actuation mechanism based on the current axial position to eliminate adverse clutch vibratory responses; and cause the clutch actuation mechanism to move to the post-engagement position.

An example 10 includes the subject matter of example 9, and includes a position sensor coupled to the clutch actuation mechanism, wherein the current axial position of the clutch actuation mechanism is determined based on output of the position sensor. An example 11 includes the subject matter of example 9 or example 10, where the electronics are to determine an input speed based on output of the input speed sensor, determine an output speed based on output of the output speed sensor, compare the input speed to the output speed, and determine the current axial position when the input speed is substantially equal to the output speed. An example 12 includes the subject matter of any of examples 9-11, where the electronics are to determine a starting position of the clutch actuation mechanism, wherein the starting position is an axial position of the clutch mechanism prior to clutch engagement, and determine the current axial position of the clutch actuation mechanism relative to the starting position. An example 13 includes the subject matter of example 12, where the electronics are to determine the post-engagement position based on a difference between the current axial position and the axial position adjustment. An example 14 includes the subject matter of any of examples 9-13, where the electronics are to execute the vibratory clearance control logic to prevent an undesired vibratory response. An example 15 includes the subject matter of any of examples 9-14, where the electronics are to, periodically over time, determine a distance to clutch engagement based on a difference between a starting position and the current axial position, and decrease the axial position adjustment as the distance to clutch engagement increases.

An example 16 includes the subject matter of any of examples 9-15, where the post-engagement position is between a starting position and the current axial position, and wherein the starting position is an axial position of the clutch mechanism prior to clutch engagement.

In an example 17, a controller includes clutch vibratory response clearance control logic configured to, over time during operation of the controller: determine a current axial position of a clutch actuation mechanism for a clutch, at clutch engagement; determine an axial position adjustment for the clutch actuation mechanism after clutch engagement based on a desired vibratory response; and move the clutch actuation mechanism to a post-engagement position defined by a difference between the current axial position and the axial position adjustment.

An example 18 includes the subject matter of example 17, and is configured to determine an input speed based on output of the input speed sensor, determine an output speed based on output of the output speed sensor, compare the input speed to the output speed, and determine the current axial position when the input speed is substantially equal to the output speed. An example 19 includes the subject matter of any of examples 17-18, and is configured to determine a starting position of the clutch actuation mechanism, wherein the starting position is an axial position of the clutch mechanism prior clutch engagement, and determine the current axial position of the clutch actuation mechanism relative to the starting position. An example 20 includes the subject matter of example 19, and is configured to determine the post-engagement position based on a difference between the current axial position and the axial position adjustment. An example 21 includes the subject matter of any of examples 17-20, and is configured to execute the vibratory clearance control logic to prevent an undesired vibratory response. An example 22 includes the subject matter of any of examples 17-21, and is configured to, periodically over time, determine a distance to clutch engagement based on a difference between a starting position and the current axial position, and decrease the axial position adjustment as the distance to clutch engagement increases. An example 23 includes the subject matter of any of examples 17-21, where the post-engagement position is between a starting position and the current axial position, and wherein the starting position is an axial position of the clutch mechanism prior to clutch engagement.

In an example 24, a method for controlling a clutch vibratory response includes, with a controller: determining a current axial position of a clutch actuation mechanism for a clutch at clutch engagement; determining a post-engagement position for the clutch actuation mechanism after clutch engagement based on a desired vibratory response; and moving the clutch actuation mechanism to the post-engagement position for the desired vibratory response.

An example 25 includes the subject matter of example 24, and includes determining an input speed based on output of the input speed sensor, determining an output speed based on output of the output speed sensor, comparing the input speed to the output speed, and determining the current axial position when the input speed is substantially equal to the output speed. An example 26 includes the subject matter of any of examples 24-25, and includes determining a starting position of the clutch actuation mechanism, wherein the starting position is an axial position of the clutch mechanism prior to clutch engagement, and determining the current axial position of the clutch actuation mechanism relative to the starting position. An example 27 includes the subject matter of example 26, and includes determining the post-engagement position based on a difference between the current axial position and the axial position adjustment. An example 28 includes the subject matter of any of examples 24-27, where the method is executed in response to a determination that a current vibratory response exceeds a desired vibratory response. An example 29 includes the subject matter of any of examples 24-28, and includes periodically over time, determining a distance to clutch engagement based on a difference between a starting position and the current axial position, and decreasing the axial position adjustment as the distance to clutch engagement increases. An example 30 includes the subject matter of any of examples 24-28, where the post-engagement position is between a starting position and the current axial position, and wherein the starting position is an axial position of the clutch mechanism prior to clutch engagement.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

FIGS. 4A and 4B1-4B3 are simplified flow diagrams of embodiments of clutch vibratory response clearance control logic, which may be executed by one or more components of the propulsion system of FIG. 1;

DETAILED DESCRIPTION OF THE DRAWINGS

Figure 1:
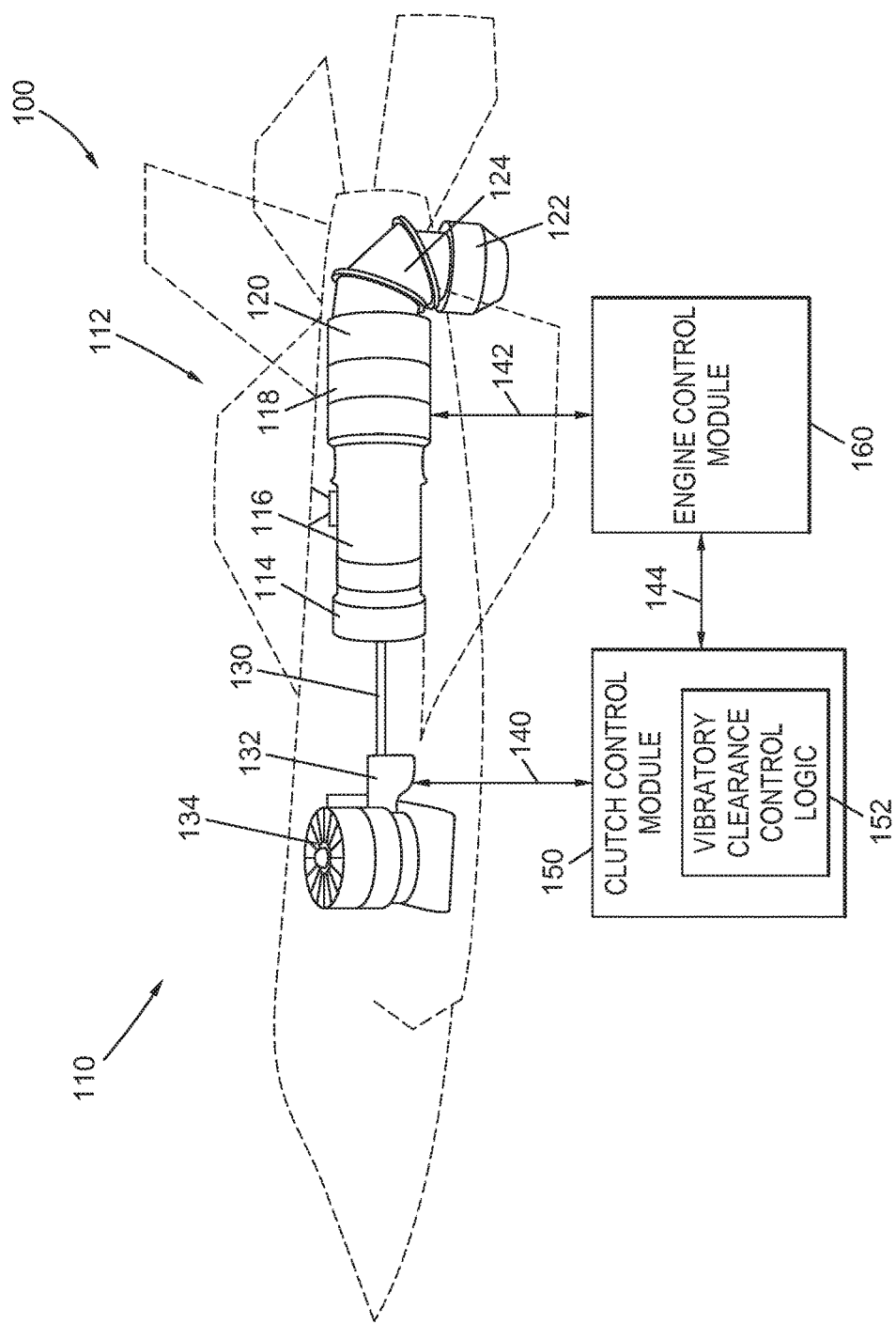
FIG. 1 is a simplified schematic diagram of an exemplary implementation of the present invention in an aircraft gas turbine engine system having a lift fan coupled to a gas turbine engine by a shaft and a clutch, and with a clutch vibratory response clearance control system in communication with the clutch, as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

In some applications, a clutch transmission is used to connect a gas turbine engine to an accessory, such as a lift system. In some applications, the clutches of such a clutch transmission operate at higher speeds; for example, in the range of about 8,000 revolutions per minute (rpm), or higher speed. The higher operating speeds of such clutches may amplify the vibration of the clutch plates, particularly as the axial clearance between the clutch plates increases due to clutch plate wear, high operating temperatures, and/or other factors.

As disclosed herein, an embodiment of vibratory response clearance control logic 152 manages the axial clearance within a clutch in order to control the magnitude of the clutch's vibratory response. The illustrative vibratory response clearance control logic 152 can provide continuously variable clutch system-level axial clearance compensation, in order to dampen the vibratory response of the clutch system. While illustrated herein as part of electronics of the propulsion system 100, it should be understood that in other embodiments, the vibratory response clearance control logic 152 or portions thereof can be implemented as a mechanical, hydraulic, pneumatic, or other type of physical control device. Further, while illustrated herein in the context of an aircraft system, it should be understood that the disclosed technologies have application to many other types of clutch transmissions, including but not limited to many different types of dry clutch designs and high speed clutches. Additionally, aspects of the disclosed technologies have application to lower speed clutches and other types of torque transfer mechanisms in which it may be desirable to manage vibratory responses. Further, aspects of the disclosed technologies may be applied in various contexts to achieve desired vibratory response characteristics and/or to satisfy other needs, requirements, or objectives. For instance, while illustrated herein in connection with a gas turbine engine, the features disclosed herein are applicable to other types of engines or drive units, including but not limited to motor vehicle transmissions (e.g., clutch transmissions used in trucks, automobiles, motorcycles, and other types of powered vehicles).

Referring now to FIG. 1, an exemplary propulsion system 100 is embodied in a vehicle (here, an aircraft) 110 (shown in phantom). The illustrative propulsion system 100 includes a drive unit, e.g., a gas turbine engine 112, an input shaft 130 (which may also be referred to as a driveshaft) coupled to the engine 112, a clutch transmission 132 coupled to the input shaft 130, and an output or load (here, an accessory, e.g., a vertical lift system) 134. The illustrative vehicle 110 is embodied as a jet aircraft having vertical lift capabilities, such as Short Take-Off and Vertical Landing (STOVL) technology. In other embodiments, the vehicle 110 may take the form of another type of aircraft, a ground-based vehicle, an amphibious vehicle, a marine vehicle, or another type of propulsion device.

The illustrative gas turbine engine 112 includes an intake fan 114, one or more compressors 116, a combustion chamber 118, one or more turbines 120, and an exhaust nozzle 122. Illustratively, the exhaust nozzle 122 is coupled to a jet pipe 124, such as a three-bearing swivel module (3BSM). In operation, air enters the engine 112 via the fan 114, is compressed by the one or more compressors 116 and supplied to the combustion chamber 118. The combustion reaction that occurs in the combustion chamber 118 drives the one or more turbines 120, which supply power to drive the rotation of the shaft 130. The exhaust air is expelled through the nozzle 122, which may be directed vertically downward by the jet pipe 124 in some circumstances, as shown in FIG. 1

Figure 3:
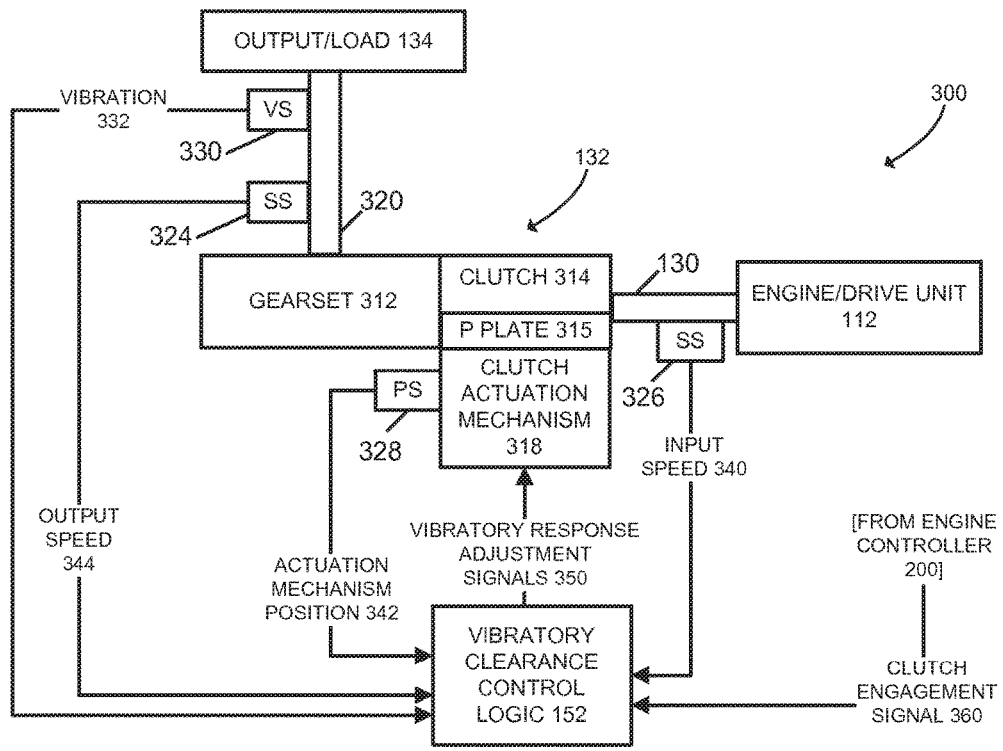
FIG. 3 is a simplified schematic diagram of an exemplary configuration of components of the propulsion system of FIG. 1, including the vibratory response clearance control logic of FIG. 1, as disclosed herein.

The clutch transmission 132 selectively connects the input shaft 130 to the lift system 134. A schematic diagram of one embodiment of the clutch transmission 132 is shown in FIG. 3, described below. When the lift system 134 is connected to the shaft 130, the shaft 130 drives rotation of a pair of counter-rotating fans of the lift system 134. Operation of the fans of the lift system 134 causes air to be drawn into the lift system 134 from above the aircraft 110. The drawn-in air flows in a vertical/downward direction through the lift system 134 and exhausts out of a vane box at the bottom of the lift system 134. Operation of the lift system 134 generates thrust to provide vertical lift capabilities for the aircraft 110.

Figure 2:
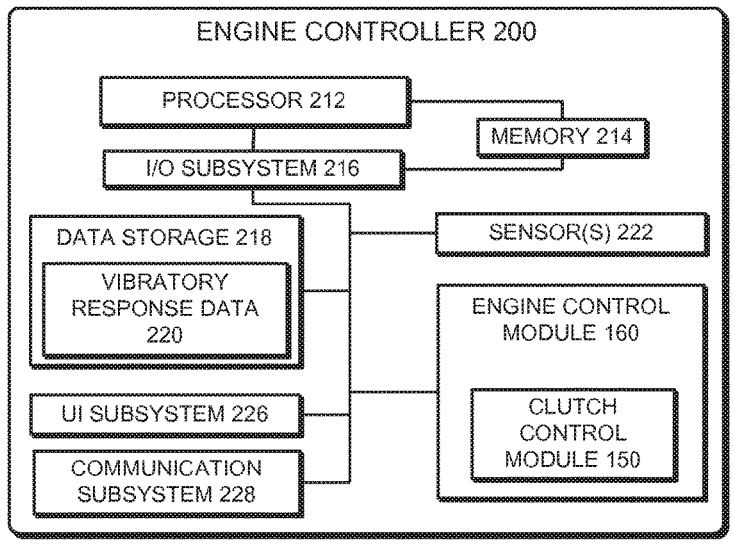
FIG. 2 is a simplified schematic block diagram of components of an exemplary engine controller that may be used in the aircraft of FIG. 1, with the engine controller having an engine control module and a clutch control module including the clutch vibratory response clearance control logic of FIG. 1.

Electrical and/or mechanical components of at least the clutch transmission 132 and the gas turbine engine 112 are bidirectionally communicatively coupled to a clutch control module 150 and an engine control module 160, by communication links 140, 142, respectively. The illustrative engine control module 160 is in bidirectional communication with the clutch control module 150 by a communication link 144. The engine control module 160 and the clutch control module 150 may be embodied in the same or separate physical structures. For example, in some embodiments, the clutch control module 150, including the vibratory response clearance control logic 152, may be embodied as a subcomponent of the engine control module 160 as shown in FIG. 2, described below. The communication links 140, 142, 144 may each be embodied as an engine datalink (or "data bus") or as portions of a data communication network of the aircraft 110, for example. In general, the clutch control module 150 contains electronics that receive data signals from a number of different sensors displaced in various locations on or in relation to the clutch transmission 132, to monitor and control the operation of the clutch transmission 132 (e.g., to control the engagement and release of the clutches of the clutch transmission 132 in response to various commands and/or operating conditions that occur during operation of the aircraft 110, and provide diagnostics). Similarly, the engine control module 160 contains electronics that electronics that receive data signals from a number of different sensors displaced in various locations on or in relation to the gas turbine engine 112, to monitor and control the operation of the gas turbine engine 112 (e.g., to control the dispensation of fuel into the combustion chamber 118, and provide diagnostics). Features of the clutch control module 150 and the engine control module 160 are described in more detail below.

Referring now to FIG. 2, the electronics of the propulsion system 100 (e.g., the clutch control module 150, the vibratory response clearance control logic 152, and the engine control module 160) are illustratively embodied in an engine controller 200. The engine controller 200 can be embodied as one or more computing devices and/or electrical circuitry (e.g., hardware, software, firmware, or a combination thereof), device, or combination thereof, capable of performing the functions described herein. For example, the engine controller 200 or portions thereof may be embodied as a full authority digital electronic computer (FADEC), an electronic engine controller (EEC), an engine control unit (ECU), Engine Health Monitoring Unit or Engine Monitoring Unit (EHM or EMU) and/or any other computing device or system configured to perform the functions described herein. Illustratively, the engine controller 200 includes: a processor 212 (e.g., any type of processor capable of performing the functions described herein, including a multi-core processor or processing/controlling circuit, digital signal processor, etc.); an input-output (I/O) subsystem 216 (e.g., circuitry and/or components to facilitate input/output operations with the processor 212, memory 214, and other components of the system 100); a data storage device 218 (e.g., any type of physical device or devices configured for short-term or long-term storage of data such as, for example, memory devices and circuits, memory cards, hard disk drives, solid-state drives, flash memory or other read-only memory, memory devices that are combinations of read-only memory and random access memory, or other data storage devices); sensors 222 (e.g., any suitable type of sensor capable of performing the functions described herein, including torque sensors, speed sensors, pressure sensors, position sensors, etc.); and the memory 214 (e.g. any type of volatile or non-volatile memory or data storage capable of performing the functions described herein to e.g., store various data and software used during operation of the propulsion system 100, as well as any necessary operating systems, applications, programs, libraries, drivers, or other supporting components). The illustrative data storage device 218 stores vibratory response data 220 in a suitable computer readable format (e.g., an electronic data file, table, database, or other suitable data structure).

The illustrative engine controller 200 includes a user interface (UI) subsystem 226. The user interface subsystem 226 includes one or more devices to facilitate user interaction with the propulsion system 100, such as physical or virtual control buttons or keys, a microphone, a speaker, a display device, and/or others. For example, a display device, which may be embodied as any type of display capable of displaying digital information such as a liquid crystal display (LCD), a light emitting diode (LED), a cathode ray tube (CRT), or other type of display device. In some embodiments, the display device may be coupled to a touch screen or other human-computer interface device to allow user interaction with the propulsion system 100 (for example, to connect the load/output/accessory 134 to the engine 112).

The illustrative engine controller 200 also includes a communication subsystem 228, which includes communication components (e.g., 140, 142, 144, etc.), each of which may be embodied as any communication circuit, device, or collection thereof, capable of enabling communications between the various components of the propulsion system 100 and/or other devices. The communication subsystem 228 may be configured to use any one or more communication technology (e,g., wireless, optical, or wired communications) and associated protocols (e.g., radio frequency (RF), cellular, Ethernet databus, RS485 databus, ARINC (Aeronautical Radio, Inc.) databus, CAN (Controller Area Network) databus, BLUETOOTH, WIFI, Near Field Communication, etc.) to effect such communication. Portions of the communication subsystem 228 may be embodied as network adapters, including wireless network adapters.

The illustrative engine controller 200 also includes a number of computer program components, such as the vibratory response clearance control logic 152 and the vibratory response data 220. These computer program components, including the vibratory response clearance control logic 152 and the vibratory response data 220, may be individually or collectively embodied as any suitable form of computer application (e.g., software code and/or data structures, firmware, hardware, or a combination thereof). In some embodiments, the computer program components may include an interactive or "front end" application that interacts directly or indirectly with an end user via, for example, a display device or another user interface component, and/or "back end" applications that process data and/or instructions and interface primarily with front end applications. The engine controller 200 may include other or additional components, such as those commonly found in a mobile and/or stationary computer. Additionally, in some embodiments, one or more of the illustrative components may be incorporated in, or otherwise form a portion of, another component.

Referring now to FIG. 3, an embodiment of the clutch transmission 132 is shown in the context of surrounding components and modules. The illustrative clutch transmission 132 includes a gearset 312, a clutch 314, a clutch pressure plate 315, a clutch actuation mechanism 318, and an output shaft 320. In operation, the clutch actuation mechanism 318 causes the pressure plate 315 to engage the clutch 314 to mechanically connect the accessory 134 to the input shaft 130, via the gearset 312. In the illustrative aircraft lift system embodiment, the gearset 312 is configured (e.g., with one or more bevel gears) to redirect torque to the output shaft 320, which is orthogonal to the input shaft 130. However, this need not be the case, and it should be understood that the shafts 130, 320 may be parallel and/or concentric, in other embodiments, and moreover, the gearset 312 or portions thereof may be omitted, in other embodiments.

Figure 5A:
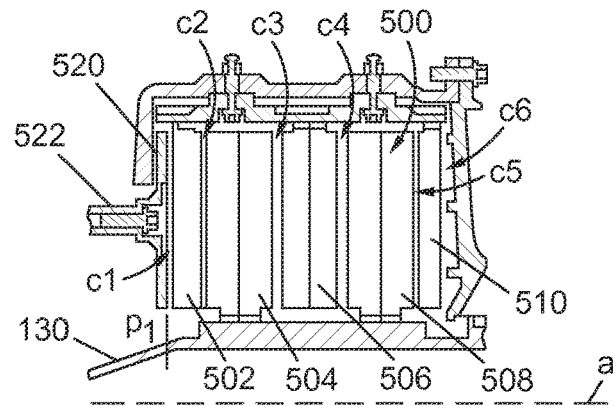
FIG. 5A is a sectional view taken along a longitudinal axis a, of at least one embodiment of a clutch, showing clutch plates without wear and a pressure plate in an axial position p1.
Figure 5B:
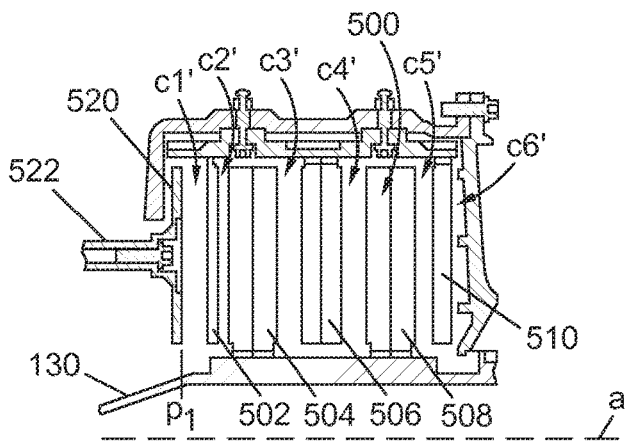
FIG. 5B is a sectional view of the clutch of FIG. 5A, showing worn clutch plates and the pressure plate in the axial position p1, without the vibratory response clearance control logic of FIG. 1.
Figure 5C:
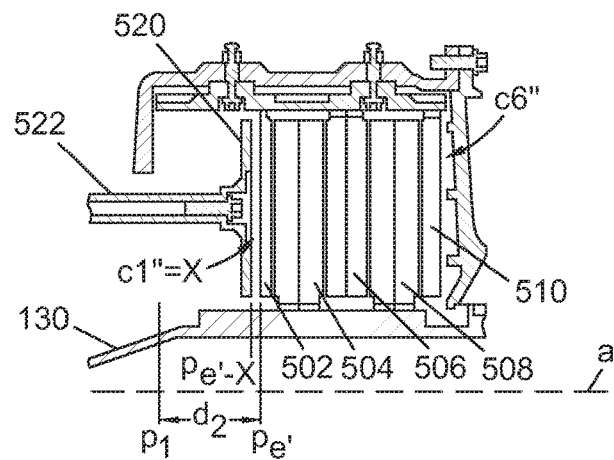
FIG. 5C is a sectional view of the clutch of FIG. 5B, showing adjustment of the axial position of the pressure plate by the vibratory response clearance control logic of FIG. 1, as disclosed herein.

The clutch 314 may be embodied as any type of clutch, brake, or other friction device or torque transmitting mechanism capable of performing the functions described herein. The illustrative clutch 314 is a high speed dry clutch configured with multiple clutch plates and a pressure plate. An embodiment of the clutch 314 including clutch plates and a pressure plate is shown in FIGS. 5A-5C, described below. The clutch actuation mechanism 318 is embodied as any suitable mechanism for causing the clutch plates of the clutch 314 to mechanically engage and disengage (release) as needed. For example, the clutch actuation mechanism 318 may be embodied as a clamp actuator, e.g., a clamping actuator or other suitable type of e.g., electromechanical, mechanical, hydraulic, or pneumatic actuator, which applies a linear force to the clutch pressure plate to cause axial movement of the pressure plate, resulting in engagement or disengagement of the clutch plates as the case may be.

During operation of the propulsion system 100, an input speed sensor 326 coupled to the input shaft 130 periodically samples and measures the rotational speed of the input shaft 130 and outputs a transmission input speed 340 for use by the vibratory response clearance control logic 152 as described below. Similarly, an output speed sensor 324 coupled to the shaft 320 periodically samples and measures the rotational speed of the shaft 320 and outputs a transmission output speed 340 for use by the vibratory response dampening logic 152 as described below. A position sensor 328 coupled to the clutch actuation mechanism 318 monitors the movement of the clutch actuation mechanism 318 and tracks the axial position of the clutch actuation mechanism 318 (e.g., relative to a starting position, p1 shown in FIGS. 5A-5C. The position sensor 328 outputs an actuation mechanism position 342 for use by the vibratory response clearance control logic 152. The position sensor 328 may be embodied as, for example, a linear variable differential transformer (LVDT) (also called a differential transformer, a linear variable displacement transformer, or a linear variable displacement transducer), or another suitable type of electrical transformer or other device used for measuring linear displacement (e.g., axial position). Illustratively, a vibration sensor 330 (e.g., a piezoelectric accelerometer) is also coupled to the output shaft 320. The vibration sensor 330 periodically samples and measures vibration of the output shaft 320 and outputs a vibration measurement 332 for use by the vibratory response clearance control logic 152 as described below.

As should be understood, the electrical signals output by the sensors 324, 326, 328 may be pre-processed by, e.g., an analog to digital converter (ADC), an amplifier, one or more filters, a digital signal processor, and/or other signal processing or signal conditioning components as needed according to a particular design of the propulsion system 100, prior to use by the vibratory response clearance control logic 152.

During operation of the propulsion system 100, the illustrative vibratory response clearance control logic 152 is used to control the axial movement of the clutch pressure plate (driven by the clutch actuation mechanism 318) after clutch engagement. As such, execution of portions of the logic 152 is triggered by a clutch engagement signal 360. The clutch engagement signal 360 may be output by the engine controller 200 (e.g., by the engine control module 160) from time to time in response to operator commands, changes in operating conditions of the aircraft 110, etc.

The axial movement of the clutch pressure plate 315 is determined or estimated based on the axial position of the clutch actuation mechanism 318 (e.g., a drive arm thereof), which is measured by the position sensor 328. The illustrative logic 152 monitors the input speed 340, the output speed 344, and the actuation mechanism position 342. The logic 152 uses the input speed 340 and the output speed 344 to determine the zero clearance position (or clutch engagement position) of the clutch 314. The zero clearance position is the axial position of the clutch actuation mechanism 318 when the clutch is fully engaged (i.e., the position that results in "zero" axial clearance within the clutch 314; that is, no or a negligible amount of free space between the clutch plates and the pressure plate). The logic 152 detects clutch engagement by comparing the input speed 340 to the output speed 344. When the input speed 340 and the output speed 344 are the same, the clutch 314 is engaged. It should be understood that other methods of determining the zero clearance position can be used equally as well. For example, the position of the clutch pressure plate 315 can be measured directly, rather than estimated or determined based on the position of the clutch actuation mechanism 318, in some embodiments.

The logic 152 determines the current axial position of the clutch actuation mechanism 318 at clutch engagement based on the output of the position sensor 328 (i.e., the actuation mechanism position signal 342) when the input speed 340 equals the output speed 344. The difference between the zero clearance position and the starting axial position of the clutch actuation mechanism 318 indicates the distance to clutch engagement, i.e., the distance that the pressure plate has to travel in order to engage the clutch. The starting position of the clutch is indicated by the position of the clutch actuation mechanism 318 prior to clutch engagement, i.e., the position of the clutch before the clutch has been engaged. The starting position of the clutch is also detected by the position sensor 328, but could also be known a priori based on manufacturer specifications, test results, etc.

As the clutch plates wear over time, the distance to clutch engagement increases, such that returning the clutch actuation mechanism 318 to the starting position post clutch engagement can result in an amount of axial clearance within the clutch 314 that may cause an undesirable vibratory response within the clutch 314. Accordingly, the logic 152 can determine an appropriate post-engagement axial position for the clutch actuation mechanism 318 to achieve a desired clutch vibratory response, based on the then-current axial position at engagement, the distance to clutch engagement, and/or other factors. For example, the logic 152 may access the vibratory response data 220 in order to determine a suitable post-engagement position or a suitable post engagement axial position adjustment for the clutch actuation mechanism 318. As such, the vibratory response data 220 may be embodied as, for example, a look up table that maps or correlates axial position data, vibratory response data, and recommended axial position adjustments, or as a mapping function (e.g., a mathematical formula implemented in computer code as a computation, sequence of computations, or Boolean logic), which takes the current axial position at engagement and the distance to engagement as inputs and outputs a recommended axial position adjustment. The vibratory response data 220 may be established offline, e.g., as a result of experimentation, or developed or improved during the use of the propulsion system 100 (using, e.g., a machine learning process), FIG. 6, described below, graphically illustrates a relationship between frequency and axial clearance that can be used as part of the vibratory response data 220.

Once the logic 152 has determined an appropriate axial position adjustment for the clutch actuation mechanism 318, the logic 152 outputs a vibratory response adjustment signal 350 to the clutch actuation mechanism 318 to cause the clutch actuation mechanism 318 to return, post-clutch engagement, not to the starting position but to an axial position between the starting position and the current axial position at engagement—i.e., the current axial position at clutch engagement less the axial position adjustment. In other words, rather than returning to the starting position after clutch engagement, the clutch actuation mechanism 318 moves back toward the starting position by the amount of the axial position adjustment. Stated another way, the axial position adjustment can be computed as an offset that is applied to the current axial position at clutch engagement (e.g., the zero clearance position) or conversely, as the difference between the offset and the current axial position, if the offset is applied to the starting position.

Referring now to FIGS. 4A and 4B1-4B3, illustrative methods 400A, 400B1, 400B2, 400B3 that may be executed by electronics of the propulsion system 100 (e.g., by the engine controller 200 and the clutch control module 150) and/or other components of the propulsion system 100 (and/or by one or more non-electronic components, in some embodiments), to perform clutch vibratory response clearance control as disclosed herein, is shown. Aspects of the methods 400A, 400B1, 400B2, 400B3 may be embodied as electrical circuitry, computerized programs, routines, logic and/or instructions, or by non-electronic devices. For example, a mechanical spring or other suitable type of mechanical device can be used to control the position of the clutch actuation mechanism 318, in some embodiments. The illustrative methods 400A, 400B1, 400B2, 400B3 can executed by the system 100 in real time during normal operation of the propulsion system 100 or in an offline environment (e.g., during engine testing or aircraft maintenance).

Figure 4A:
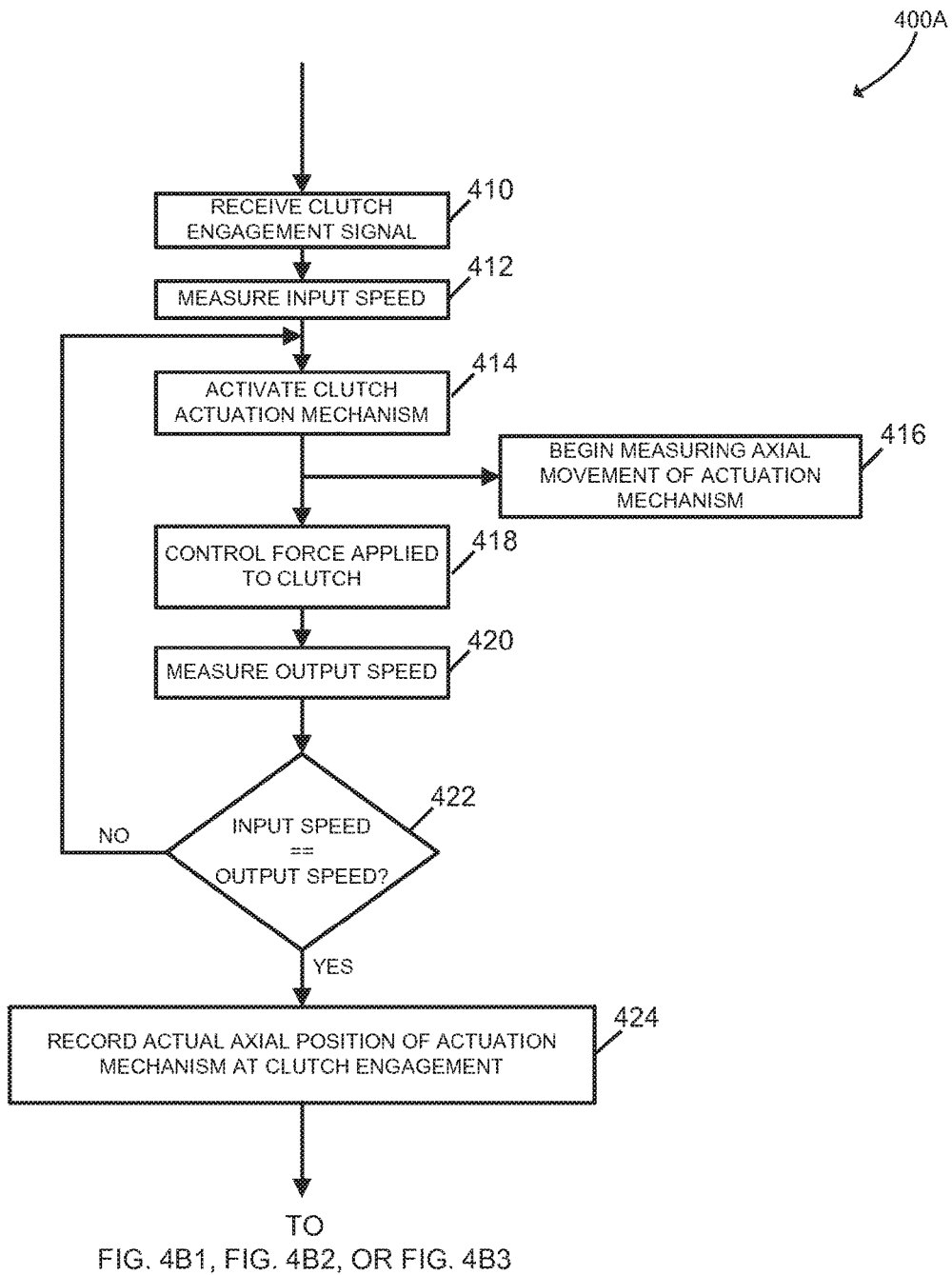

FIG. 4A illustrates a process for determining the current axial position of the clutch pressure plate 315 during operation of the system 100. At block 410, the propulsion system 100 receives a clutch engagement signal (e.g., from the engine control module 160), which indicates that a request for clutch engagement has been received. At block 412, the system 100 measures the speed of the input shaft 130. To do this, the system 100 receives and processes data signals from a speed sensor coupled to the shaft 130 (e.g., the input speed sensor 326). At blocks 414 and 418, the system 100 initiates engagement of the clutch (e.g., clutch 314) and controls the amount of force applied to the clutch pressure plate (e.g., pressure plate 315) over the clutch engagement time period to cause smooth engagement of the clutch. To do this, the system 100 activates the clutch actuation mechanism (e.g., clutch actuation mechanism 318), in block 414, to begin moving the pressure plate 315 toward the clutch plates (see, e.g., FIGS. 5A-5C), and controls the force applied to the pressure plate at block 418, until clutch engagement is achieved. During the clutch engagement process, at block 416, the system 100 monitors and measures the amount of axial movement of the clutch actuation mechanism that is required to engage the clutch, and thereby determines the distance to clutch engagement. To do this, the system 100 receives and processes data signals output by a position sensor (e.g., the position sensor 328).

At block 420, the system 100 determines the speed of the transmission output shaft (e.g., the output shaft 320), and at block 422 the system determines whether clutch engagement has occurred. To do this, the system 100 compares the input speed obtained in block 412 to the output speed obtained in block 420. If the input speed and the output speed are substantially equal (or exactly equal), the system 100 concludes that clutch engagement has occurred and proceeds to block 424. If the system 100 concludes in block 422 that there is still a difference between the input speed and the output speed (and thus, clutch engagement has not occurred), the system 100 returns to block 414, and continues controlled movement of the pressure plate (via the clutch actuation mechanism) and axial position measurements, until clutch engagement is achieved.

At block 424, the system 100 records the actual current axial position of the clutch actuation mechanism at clutch engagement (e.g., the zero clearance position), as described above. The difference between the zero clearance position and the starting axial position corresponds to the linear displacement of the pressure plate required to engage the clutch (i.e., the distance to clutch engagement). The system 100 records the current axial position at engagement by at least temporarily storing the data value in memory (e.g., the memory 214).

Following block 424, different embodiments of the system 100 may proceed to FIG. 4B1, or FIG. 4B2, or FIG. 4B3, in accordance with the requirements or design of the specific embodiment of the system 100. FIGS. 4B1, 4B2, and 4B3 represent different approaches to accomplishing post-engagement axial position adjustment of a clutch pressure plate as disclosed herein. It should be understood that the processes shown in FIGS. 4B1, 4B2, and 4B3 are illustrative, and variations of these processes can be made as needed in a particular embodiment of the system 100.

Referring to FIG. 4B1, an "open loop" approach, a method 400B1, to the post-engagement axial position adjustment of a clutch pressure plate is shown. At block 428B1, the system 100 determines the axial position adjustment, X. In FIG. 4B1, the value of X can be static, i.e., known a priori (pre-determined). For example, X may be a fixed value (e.g., stored as a constant) or range of values (e.g., stored in an array or lookup table), At block 430B1, the system 100 simply applies the value of X obtained in block 428B1 to the axial position at engagement recorded in block 424, and causes the axial position of the clutch actuation mechanism to be adjusted by X (e.g., by returning the clutch actuation mechanism to the engagement position minus X, post engagement).

Referring now to FIG. 4B2, a "closed loop" approach, a method 400B2, to the post-engagement axial position adjustment of a clutch pressure plate is shown. At block 428B2, the system 100 determines the axial position adjustment, X. To do this, the system 100 may use any of the approaches described above with reference to block 428B1, or may determine X dynamically, e.g., based on the current axial position (or the current distance to engagement) and the desired clutch vibratory response. For example, as the distance to engagement (or the current axial position relative to the starting position) increases, the amount of axial position adjustment X may become smaller, thereby resulting in the pressure plate returning to a post-engagement position that results in a smaller amount of axial clearance.

It should be understood that the axial position adjustment X is variable depending on the requirements or the design of a particular propulsion system 100, i.e., the amount of axial clearance needed to prevent undesired vibration in different embodiments of the system 100 will likely be different. The axial position adjustment X can be determined iteratively through testing and/or operational experience. For example, X can be derived from an analysis of test data, e.g., by plotting test results to understand the relationship of axial clearance to vibration, and then identifying, from such analysis, one or more "target" axial clearance values (e.g., a discrete value or a range of values, as the case may be in a particular implementation) that result in a desired amount (e.g., a low amount) of vibration.

Once X is determined, the system 100 can adjust the axial clearance to the target clearance in response to a detection of a vibratory response falling outside a desired range (or above or below a threshold value). So, while not specifically shown in FIGS. 4A or 4B, it should be understood that execution of the method 400B1 or the method 400B2 by the system 100 can be triggered by the detection of an undesirable vibratory response (e.g., high vibration exceeding a desired range or threshold value), as shown in FIG. 4B3, described below. In some cases, a comparison of the current clutch vibratory response to the vibratory response data 220 can be made, and then a determination of X made if the current clutch vibratory response falls outside the desired range (or above or below the desired threshold value, as the case may be). If the current clutch vibratory response is within the desired range (or above or below the desired threshold value, as the case may be), the steps involved in the computation of X can be omitted.

At block 430B2, following clutch engagement (e.g., when it is time to release the clutch), the system 100 adjusts the axial position of the clutch actuation mechanism (and thus, the pressure plate) by the amount of axial position adjustment, X, determined in block 428B2. To do this, the system 100 moves the clutch actuation mechanism in the linear direction opposite the direction of movement for clutch engagement, by the adjustment amount X, rather than returning the clutch actuation mechanism all the way back to the starting position.

At block 432, the system 100 determines whether the desired clutch vibratory response has been achieved following the axial position adjustment accomplished in block 430B2. If the desired vibratory response has not been achieved, the system 100 can return to block 428B2 and compute a new axial adjustment value, and perform another axial position adjustment in block 430B2. In other words, according to the method 400B2, the system 100 can refine the axial position adjustment X as needed in order to achieve the desired vibratory response. That is, the system 100 can iteratively and continuously adjust the axial position of the clutch actuation mechanism over time in order to control the clutch vibratory response to a desired level, even in the presence of increasing clutch wear. Following block 432, the system 100 can return to block 428B2 to repeat the method 400B2 in response to the next clutch engagement, or the method 400B2 may simply end.

Referring now to FIG. 4B3, a closed loop approach, method 400B3, utilizes one or more sensor inputs to determine whether a post-engagement axial position adjustment is needed. At block 440, the system 100 obtains or measures one or more sensor inputs from, e.g., position sensors, speed sensors, temperature sensors, vibration sensors, etc. At block 442, the system 100 determines whether the sensor input(s) indicate a need for axial position adjustment of the pressure plate (e.g., whether the clutch plate temperature or vibration of the output shaft indicates too much axial clearance within the clutch). If the determination made in block 442 is negative, the system 100 returns to block 440 and continues monitoring the sensor input(s). If the determination made in block 442 is positive, i.e., the sensor input(s) indicate that axial position adjustment of the pressure plate is needed, the system 100 proceeds to block 428B3. In block 428B3, the system 100 determines the appropriate amount of axial position adjustment, X, using any of the approaches described above in connect with block 428B1 or block 428B2. In block 430B3, the system 100 causes the pressure plate (e.g., via the clutch actuation mechanism) to move back toward the starting position by the adjustment amount, X (using, e.g., any of the approaches described above in connection with block 430B1 or block 430B2). In block 444, the system 100 determines if the desired change in vibratory response has been achieved as a result of the adjustment. If the determination in block 444 is negative, the system returns to block 430B3 and performs another adjustment. If the determination in block 44 is positive, the method 400B3 may simply end or return to block 440 to continue monitoring the sensor input(s).

Referring now to FIG. 5A, an embodiment 500 of the clutch 314 is shown in a disengaged position in which there is no clutch wear. The clutch 500 includes a number of clutch plates 502, 504, 506, 508, each of which is rotatable about an axis a. A pressure plate 520 is bidirectionally movable along the axis a to engage and disengage the clutch plates 502, 504, 506, 508 as needed. Movement of the pressure plate 520 is driven by a clutch actuation mechanism 522 (e.g., a clamp actuator). In FIG. 5A, the pressure plate 520 has a starting (e.g., disengaged) position designated by $p_1$. Although not shown, it should be understood that the clutch engagement position discussed above would be slightly forward (i.e., toward the clutch plates 502, 504, 506, 508) of the position $p_1$, in FIG. 5A.

Within the clutch 500, there is an amount of axial clearance, which is defined by the sum of the axial clearance between the pressure plate and each of the clutch plates, i.e., c1+c2+c3+c4+c5+c6. As shown in FIG. 5A, the amount of axial clearance at clutch disengagement is minimal when the clutch plates are not worn. The amount of axial clearance typically increases over time due to clutch wear, temperature increases, and/or other factors. The zero clearance position discussed above would be shown similarly to FIG. 5A, except that each of c1, c2, c3, c4, c5 and c6 would have a value of zero (i.e., no clearance) at clutch engagement.

FIG. 5B illustrates the clutch 500 in the starting (e.g., disengaged) position, $p_1$, after some clutch plate wear has occurred. For example, the clutch plate 502 is significantly worn in FIG. 5B, in comparison to FIG. 5A. In FIG. 5B, the amount of axial clearance, i.e., the sum of c1'+c2'+c3'+c4'+c5'+c6', has increased in comparison to the sum of c1+c2+c3+c4+c5+c6 in FIG. 5A. In comparison to the clutch in FIG. 5A, one can easily see that the distance from the starting position, $p_1$, to clutch engagement would be greater than the corresponding distance to clutch engagement in FIG. 5A. FIGS. 5A and 5B represent the prior art, in which the disclosed vibratory response clearance control logic 152 is not available. As such, in FIG. 5B, post engagement, the clutch actuation mechanism 522 simply returns to the starting position $p_1$ (resulting in the increased amount of axial clearance post-engagement).

Referring now to FIG. 5C, application of the disclosed vibratory response clearance control logic 152 results in the determination of the axial position adjustment or offset, X. The offset X is applied to the engagement position $p_e$, so that post-engagement, the clutch actuation mechanism returns to position $p_e$-X, rather than returning all the way back to position $p_1$. In FIG. 5C, $d_2$ is the distance to clutch engagement (i.e. $p_e-p_1$). Thus, the adjusted post engagement position of the clutch actuation mechanism in FIG. 5C can alternatively be expressed as $p_1+(d_2-X)$. As a result of the axial position adjustment, the axial clearance is reduced in comparison to that of FIG. 5B (i.e., in FIG. 5C, the axial clearance is $c_r$ which is the same as X), even though there is a similar amount of clutch wear.

Figure 6:
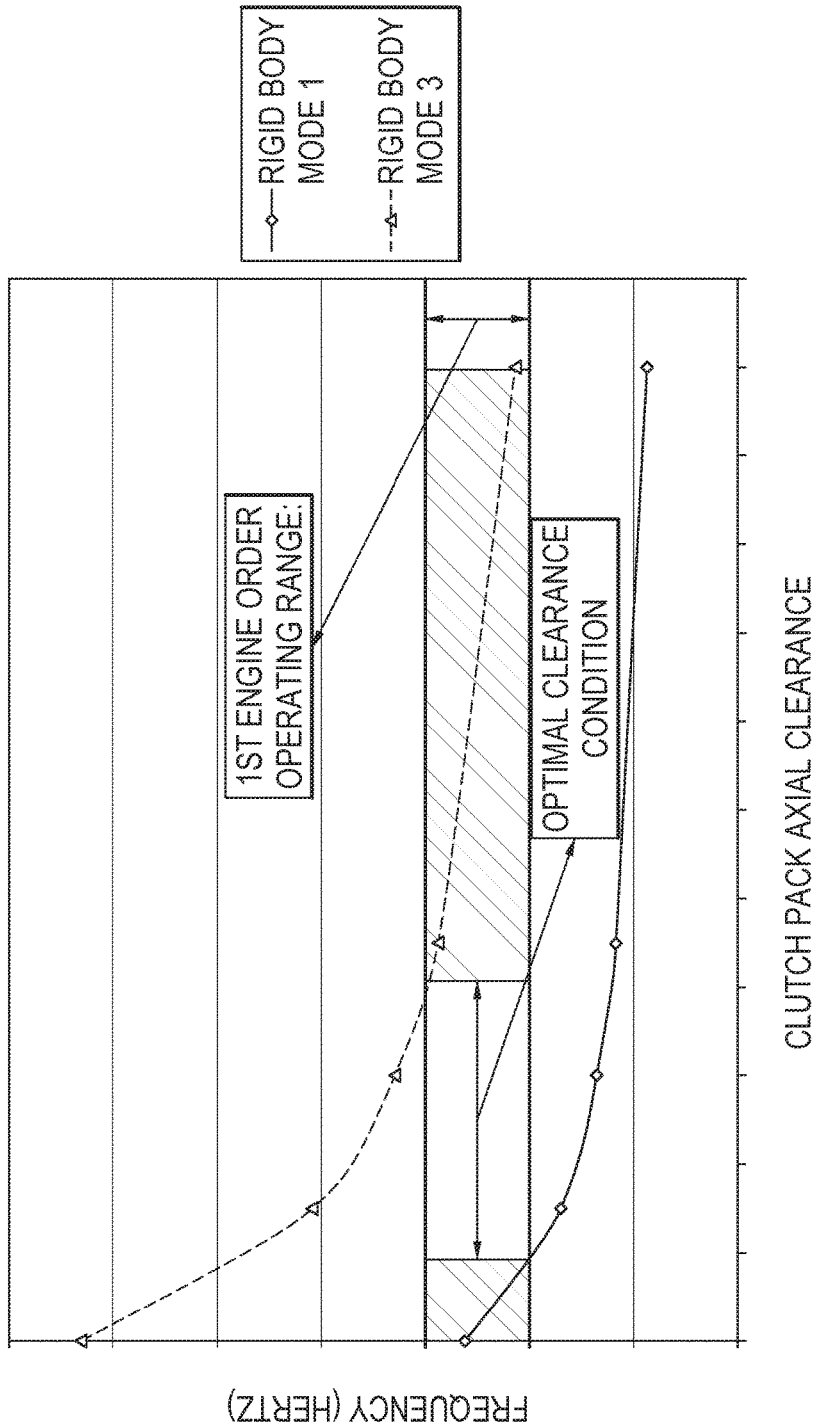
FIG. 6 is a simplified plot of a clutch system frequency vs. axial clearance relationship that may be utilized by the vibratory response clearance control logic of FIG. 1.

Referring now to FIG. 6, analytical results can be obtained for adverse clutch plate system natural frequencies that exist in first engine order operating speed range of the clutch. In the example of FIG. 6, two adverse clutch plate system natural frequencies have been determined: rigid body mode 1 and rigid body mode 3, as a function of clutch plate pack total axial clearance over the usable life of a clutch plate pack—if no clearance control as disclosed herein were utilized. The plot can then be used as the basis for defining the optimal clearance condition X, as defined in FIG. 5C, where no adverse clutch system natural frequencies exist in the first engine order operating speed range to employ in the clutch control vibratory response clearance control logic to maintain a desired vibratory condition (e.g., a "low" vibratory condition).

As discussed above, the method to achieve the "optimized" clearance condition can involve the use of an open loop system, or a closed loop control system to continuously/iteratively adjust the amount of clutch plate clearance, by moving the clutch pressure plate, in order to maintain a desired vibratory condition (e.g., a "low" vibratory condition). As an example, if it is known that early in the life of a clutch, and there is a small amount of total clearance in the clutch pack (e.g., approximately 0.05 inches), and it is known that this condition/position provides a desired vibratory response, the system 100 can maintain this desired clearance throughout the life of the clutch plates (e.g., as the clutch plates wear down). So, supposing that the entire clutch pack wears out, causing additional clearance of 1 inch, rather than continuing to operate within a clutch pack clearance of 1.05 inches, the system 100 can instead maintain the desired clearance of 0.05 inches (thus simulating the early life clearance configuration and maintaining a low vibratory condition). Among other things, the benefits of the system 100 include preventing unwanted heating of the clutch (or output/load 134), preventing problematic windmilling of the clutch, and/or avoiding or mitigating other issues affecting clutch or the output/load 134.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to an "embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine. For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

What is claimed is:

1. A propulsion system, comprising:
a gas turbine engine;
a shaft coupled to the gas turbine engine;
an input speed sensor coupled to the shaft;
a clutch coupled to the shaft;
a clutch actuation mechanism coupled to the clutch;
a load selectively coupled to the gas turbine engine by engagement of the clutch;
an output speed sensor coupled to the load; and
electronics comprising vibratory response clearance control logic to:
determine a current axial position of the clutch actuation mechanism at clutch engagement;
determine an axial position adjustment for the clutch actuation mechanism based on a sensor input; and
cause the clutch actuation mechanism to move to a post-engagement position defined by the current axial position and the axial position adjustment.

2. The propulsion system of claim 1, further comprising a position sensor coupled to the clutch actuation mechanism, wherein the current axial position of the clutch actuation mechanism at clutch engagement is determined based on output of the position sensor.

3. The propulsion system of claim 1, wherein the electronics are to determine an input speed based on output of the input speed sensor, determine an output speed based on output of the output speed sensor, compare the input speed to the output speed, and determine the current axial position when the input speed is substantially equal to the output speed.

4. The propulsion system of claim 1, wherein the electronics are to determine a starting position of the clutch actuation mechanism, and wherein the starting position is an axial position of the clutch mechanism prior to clutch engagement, and determine the current axial position of the clutch actuation mechanism relative to the starting position.

5. The propulsion system of claim 4, wherein the electronics are to determine the post-engagement position based on a difference between the current axial position and the axial position adjustment.

6. The propulsion system of claim 1, wherein the electronics are to execute the vibratory response clearance control logic to prevent an undesired vibratory response.

7. The propulsion system of claim 1, wherein the electronics are to, periodically over time, determine a distance to clutch engagement based on a difference between a starting position and the current axial position, and decrease the axial position adjustment as the distance to clutch engagement increases.

8. The propulsion system of claim 1, wherein the post-engagement position is between a starting position and the current axial position, and wherein the starting position is an axial position of the clutch mechanism prior to clutch engagement.

9. A clutch transmission system, comprising:
an input shaft capable of being driven by an engine;
an input speed sensor coupled to the input shaft;
a clutch coupled to the input shaft;
a clutch actuation mechanism coupled to the clutch; and
electronics comprising vibratory response clearance control logic to, over time during operation of the clutch transmission system:
determine a current axial position of the clutch actuation mechanism at clutch engagement;
determine a post-engagement position for the clutch actuation mechanism based on the current axial position and a desired clutch vibratory response; and
cause the clutch actuation mechanism to move to the post-engagement position.

10. The clutch transmission system of claim 9, comprising a position sensor coupled to the clutch actuation mechanism, wherein the current axial position of the clutch actuation mechanism is determined based on output of the position sensor.

11. The clutch transmission system of claim 9, wherein the electronics are to: (i) determine an input speed based on output of the input speed sensor, (ii) determine an output speed based on output of the output speed sensor, (iii) compare the input speed to the output speed, and (iv) determine the current axial position when the input speed is substantially equal to the output speed.

12. The clutch transmission system of claim 9, wherein the electronics are to determine a starting position of the clutch actuation mechanism, wherein the starting position is an axial position of the clutch mechanism prior to clutch engagement, and determine the current axial position of the clutch actuation mechanism relative to the starting position.

13. The clutch transmission system of claim 12, wherein the electronics are to determine the post-engagement position based on a difference between the current axial position and the axial position adjustment.

14. The clutch transmission system of claim 9, wherein the electronics are to execute the vibratory response clearance control logic to prevent an undesired vibratory response.

15. The clutch transmission system of claim 9, wherein the electronics are to, periodically over time, determine a distance to clutch engagement based on a difference between a starting position and the current axial position, and decrease the axial position adjustment as the distance to clutch engagement increases.

16. The clutch transmission system of claim 9, wherein the post-engagement position is between a starting position and the current axial position, and wherein the starting position is an axial position of the clutch mechanism prior to clutch engagement.

17. A method for controlling a clutch vibratory response, the method comprising, with a controller:
determining a current axial position of a clutch actuation mechanism for a clutch at clutch engagement;
determining a post-engagement position for the clutch actuation mechanism after clutch engagement based on a desired vibratory response; and
moving the clutch actuation mechanism to the post-engagement position for the desired vibratory response.

18. The method of claim 17, comprising determining an input speed based on output of the input speed sensor, determining an output speed based on output of the output speed sensor, comparing the input speed to the output speed, and determining the current axial position when the input speed is substantially equal to the output speed.

19. The method of claim 17, comprising periodically over time, determining a distance to clutch engagement based on a difference between a starting position and the current axial position, and decreasing the axial position adjustment as the distance to clutch engagement increases.

20. The method of claim 17, wherein the post-engagement position is between a starting position and the current axial position, and wherein the starting position is an axial position of the clutch mechanism prior to clutch engagement.

* * * * *